US011528087B2

(12) United States Patent
Tang

(10) Patent No.: US 11,528,087 B2
(45) Date of Patent: Dec. 13, 2022

(54) INFORMATION TRANSMISSION METHOD, DEVICE, AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 127 days.

(21) Appl. No.: 16/626,450

(22) PCT Filed: Sep. 7, 2017

(86) PCT No.: PCT/CN2017/100902
§ 371 (c)(1),
(2) Date: Dec. 24, 2019

(87) PCT Pub. No.: WO2019/047102
PCT Pub. Date: Mar. 14, 2019

(65) Prior Publication Data
US 2020/0220646 A1    Jul. 9, 2020

(51) Int. Cl.
*H04L 1/00* (2006.01)
*H04W 76/27* (2018.01)
*H04W 72/04* (2009.01)

(52) U.S. Cl.
CPC ......... *H04L 1/0013* (2013.01); *H04W 72/042* (2013.01); *H04W 72/0493* (2013.01); *H04W 76/27* (2018.02)

(58) Field of Classification Search
CPC .............. H04L 1/0013; H04W 72/042; H04W 72/0493; H04W 72/1289; H04W 76/27
See application file for complete search history.

(56) References Cited

U.S. PATENT DOCUMENTS 9,445,420 B2 * 9/2016 Guo .......................... H04L 1/00
9,756,622 B2 * 9/2017 Takeda ................ H04W 72/042
(Continued)

FOREIGN PATENT DOCUMENTS

CA     2864690 A1 * 9/2013 .......... H04B 7/2612
CN     102858014 A    1/2013
(Continued)

OTHER PUBLICATIONS

Mediatek Inc., Control Channel Design for Latency Reduction, Apr. 11, 2016, 3GPP TSG RAN WG1 Meeting #84bis, Tdoc: R1-162946 (Year: 2016).*
(Continued)

*Primary Examiner* — Eric Nowlin
(74) *Attorney, Agent, or Firm* — Ladas & Parry LLP

(57) ABSTRACT

Disclosed in the embodiments of the present invention are an information transmission method, device and system. The method comprises: generating indication information for a target terminal, the indication information is used for indicating the present state of a physical downlink control channel PDCCH of a non target terminal in a physical downlink shared channel (PDSCH) sent to the target terminal and/or the occupation state of resources of the non-target terminal; and sending the indication information to the target terminal. Thus, by means of the indication information, the terminal can learn whether a PDCCH of another terminal is present in the PDSCH sent to the terminal and/or whether there is resource occupation by the other terminal. On the basis of the content learned from the indication information, PDSCH rate matching may be implemented in order to avoid the situation of being unable to correctly analyze PDSCH data packets in a short time period due to matching errors.

12 Claims, 6 Drawing Sheets

(56) References Cited

U.S. PATENT DOCUMENTS

| | | | |
|---|---|---|---|
| 10,200,990 B2* | 2/2019 | Hugl | H04W 72/042 |
| 10,849,115 B2* | 11/2020 | Davydov | H04L 5/0044 |
| 10,849,118 B2* | 11/2020 | Kim | H04W 72/0446 |
| 11,070,310 B2* | 7/2021 | Hosseini | H04L 1/0013 |
| 11,166,264 B2* | 11/2021 | Yang | H04W 72/042 |
| 2015/0110031 A1* | 4/2015 | Takeda | H04L 5/0053 370/329 |
| 2017/0289970 A1* | 10/2017 | Yang | H04W 52/146 |
| 2018/0049189 A1* | 2/2018 | Hugl | H04L 5/0094 |
| 2018/0227889 A1* | 8/2018 | Yang | H04W 72/042 |
| 2019/0045490 A1* | 2/2019 | Davydov | H04W 28/22 |
| 2019/0268889 A1* | 8/2019 | Kim | H04W 72/042 |
| 2019/0342030 A1* | 11/2019 | Hosseini | H04L 1/18 |
| 2019/0349977 A1* | 11/2019 | Hosseini | H04W 72/0446 |
| 2020/0178231 A1* | 6/2020 | Zhang | H04L 5/0044 |
| 2021/0068115 A1* | 3/2021 | Gotoh | H04W 72/0493 |
| 2021/0076360 A1* | 3/2021 | Davydov | H04L 5/0044 |
| 2021/0084628 A1* | 3/2021 | Kim | H04W 72/042 |
| 2021/0127398 A1* | 4/2021 | Nam | H04W 72/0493 |
| 2021/0195600 A1* | 6/2021 | Khoshnevisan | H04L 5/0051 |
| 2021/0345337 A1* | 11/2021 | Ma | H04W 72/1289 |

FOREIGN PATENT DOCUMENTS

| | | | | |
|---|---|---|---|---|
| CN | 102932299 A | | 2/2013 | |
| CN | 103096374 A | | 5/2013 | |
| CN | 104335651 A | * | 2/2015 | H04L 5/0053 |
| CN | 104335651 B | * | 7/2018 | H04L 5/0053 |
| CN | 109586859 A | * | 4/2019 | |
| CN | 109586859 B | * | 6/2020 | |
| CN | 107005960 B | * | 7/2020 | H04W 76/27 |
| CN | 112088515 A | * | 12/2020 | H04L 5/0053 |
| EP | 2302803 A3 | * | 8/2014 | H04W 48/12 |
| EP | 2849510 A1 | * | 3/2015 | H04W 72/042 |
| EP | 2849510 A4 | * | 1/2016 | H04L 5/0053 |
| EP | 3198772 A1 | * | 8/2017 | H04W 56/00 |
| EP | 3198772 B1 | * | 11/2019 | H04L 5/0053 |
| EP | 3629514 A1 | * | 4/2020 | H04W 56/001 |
| EP | 3662609 A1 | * | 6/2020 | H04L 5/0051 |
| EP | 3662609 A4 | * | 9/2020 | H04W 76/27 |
| EP | 2849510 B1 | * | 11/2020 | H04W 72/042 |
| JP | 5809103 B2 | * | 11/2015 | H04W 72/042 |
| KR | 20190098727 A | * | 8/2019 | H04L 1/1858 |
| MX | 2014013506 A | * | 10/2015 | H04L 5/0053 |
| MX | 343731 B | * | 11/2016 | H04W 72/042 |
| RU | 2518966 C1 | | 6/2014 | |
| WO | 2013000440 A1 | | 1/2013 | |
| WO | 2013068832 A1 | | 5/2013 | |
| WO | WO-2013168750 A1 | * | 11/2013 | H04L 5/0053 |
| WO | WO-2018029395 A1 | * | 2/2018 | H04L 5/0094 |
| WO | WO-2019217272 A1 | * | 11/2019 | H04W 76/27 |
| WO | WO-2020055572 A1 | * | 3/2020 | H04L 1/0069 |

OTHER PUBLICATIONS

Huawei et al., Dynamic Resource Multiplexing of Downlink Control and Data, Jan. 16, 2017, 3GPP TSG RAN WG1 NR Ad Hoc Meeting, Tdoc: R1-1700397 (Year: 2017).*
Huawei et al., Resource Multiplexing of Downlink Control and Data, Feb. 13, 2017, 3GPP TSG RAN WG1 Meeting #88, Tdoc: R1-1701642 (Year: 2017).*
Intel Corporation, Dynamic Resource Sharing of Control and Data Channel, Feb. 13, 2017, 3GPP TSG RAN WG1 Meeting #88, Tdoc: R1-1702225 (Year: 2017).*
MediaTek Inc., sPDCCH Multiplexing with Data, Feb. 13, 2017, 3GPP TSG RAN WG1 Meeting #88, Tdoc: R1-1702656 (Year :2017).*
NTT Docomo, Inc., Resource Sharing Between sPDCCH and sPDSCH, Feb. 13, 2017, 3GPP TSG RAN WG1 Meeting #88 , Tdoc: R1-1702783 (Year: 2017).*
NTTDocomo, Inc., Dynamic Resource Sharing between DL Data and Control Channels, Feb. 13, 2017, 3GPP TSG RAN WG1 Meeting #88, Tdoc: R1-1702834 (Year: 2017).*
Samsung, sPDCCH Multiplexing with Data, Feb. 13, 2017, 3GPP TSG RAN WG1 Meeting #88, Tdoc: R1-1702888 (Year: 2017).*
Motorola Mobility et al., sPDCCH and sPDSCH Multiplexing, Feb. 13, 2017, 3GPP TSG RAN WG1 Meeting #88, Tdoc: R1-1703040 (Year: 2017).*
Sharp, DL Control Channel and Data Multiplexing in NR, Feb. 13, 2017, 3GPP TSG RAN WG1 Meeting #88, Tdoc: R1-1703239 (Year: 2017).*
Zte et al., Resource Sharing between PDCCH and PDSCH, Apr. 3, 2017, 3GPP TSG RAN WG1 Meeting #88bis, Tdoc: R1-1704371 (Year: 2017).*
Intel Corporation, Dynamic Resource Sharing of Control and Data Channel, May 15, 2017, 3GPP TSG RAN WG1 Meeting #89, Tdoc: R1-1707383 (Year: 2017).*
Guangdong OPPO Mobile Telecom, On Resource Sharing between PDCCH and PDSCH, May 15, 2017, 3GPP TSG RAN WG1 Meeting #89, Tdoc: R1-1707708 (Year: 2017).*
MediaTek Inc., Resource Sharing between PDCCH and PDSCH, May 15, 2017, 3GPP TSG RAN WG1 Meeting #89, Tdoc: R1-1707708 (Year: 2017).*
Panasonic, Resource Sharing between PDCCH and PDSCH, May 15, 2017, 3GPP TSG RAN WG1 Meeting #89, Tdoc: R1-1708111 (Year: 2017).*
Huawei et al., Resource Sharing between NR-PDCCH and Data, May 15, 2017, 3GPP TSG RAN WG1 Meeting #89, Tdoc: R1-1708144 (Year: 2017).*
NTT Docomo, Inc., Resource Sharing between sPDCCH and sPDSCH, May 15, 2017, 3GPP TSG RAN WG1 Meeting #89, Tdoc: R1-1708417 (Year: 2017).*
NTT Docomo, Inc., Resource Sharing between Data and Control Channels, May 15, 2017, 3GPP TSG RAN WG1 Meeting #89, Tdoc: R1-1708466 (Year: 2017).*
Nokia et al., Resource Sharing between PDCCH and PDSCH in NR, May 15, 2017, 3GPP TSG RAN WG1 Meeting #89, Tdoc: R1-1708504 (Year: 2017).*
Huawei et al., Resource Multiplexing of Downlink Control and Data, Jun. 27, 2017, 3GPP TSG RAN WG1 NR Ad Hoc Meeting, Tdoc: R1-1709956 (Year: 2017).*
Zte, Resource Sharing between PDCCH and PDSCH, Jun. 27, 2017, 3GPP TSG RAN WG1 NR Ad Hoc Meeting #2, Tdoc: R1-1710109 (Year: 2017).*
Guangdong OPPO Mobile Telecom, On Resource Sharing between PDCCH and PDSCH, Jun. 27, 2017, 3GPP TSG RAN WG1 NR Ad Hoc Meeting #2, Tdoc: R1-1710153 (Year: 2017).*
LG Electronics, Discussion on Multiplexing between Control and Data, Jun. 27, 2017, 3GPP TSG RAN WG1 NR Ad Hoc Meeting #2, Tdoc: R1-1710308 (Year: 2017).*
Huawei et al., Resource Sharing between NR-PDCCH and Data, Jun. 27, 2017, 3GPP TSG RAN WG1 NR Ad Hoc Meeting #2, Tdoc: R1-1710460 (Year: 2017).*
Intel Corporation, Dynamic Resource Sharing of Control and Data Channel, Jun. 27, 2017, 3GPP TSG RAN WG1 NR Ad Hoc Meeting #2, Tdoc: R1-1710546 (Year: 2017).*
Samsung, Multiplexing NR-PDCCH and PDSCH, Jun. 27, 2017, 3GPP TSG RAN WG1 NR Ad Hoc Meeting #2, Tdoc: R1-1710696 (Year: 2017).*
MediaTek Inc., Resource Sharing between PDCCH and PDSCH, Jun. 27, 2017, 3GPP TSG RAN WG1 NR Ad Hoc Meeting #2, Tdoc: R1-1710791 (Year: 2017).*
Nokia et al., Resource Sharing between PDCCH and PDSCH in NR, Jun. 27, 2017, 3GPP TSG RAN WG1 NR Ad Hoc Meeting #2, Tdoc: R1-1710983 (Year: 2017).*
Panasonic, Resource Sharing between PDCCH and PDSCH, Jun. 27, 2017, 3GPP TSG RAN WG1 NR Ad Hoc Meeting #2, Tdoc: R1-1711320 (Year: 2017).*
Zte et al., WF on PDCCH/PDSCH Resource Sharing, Jun. 27, 2017, 3GPP TSG RAN WG1 NR Ad Hoc Meeting #2, Tdoc: R1-1711921 (Year: 2017).*
Nokia et al., Resource Sharing between PDCCH and PDSCH in NR, Aug. 21, 2017, 3GPP TSG-RAN WG1 #90, Tdoc: R1-1714098 (Year: 2017).*

(56) References Cited

OTHER PUBLICATIONS

Motorol Mobility et al., sPDCCH and sPDSCH Multiplexing, Aug. 21, 2017, 3GPP TSG-RAN WG1 #90, Tdoc: R1-1714210 (Year: 2017).*
Zte, WF on PDCCH/PDSCH Resource Sharing, Aug. 21, 2017, 3GPP TSG-RAN WG1 #90, Tdoc: R1-1714676 (Year: 2017).*
Zte, WF on PDCCH/PDSCH Resource Sharing, Aug. 21, 2017, 3GPP TSG-RAN WG1 #90, Tdoc: R1-1715224 (Year: 2017).*
Third Office Action of the Chinese application No. 201780090734.5, dated Nov. 18, 2020.
First Office Action of the European application No. 17924137.7, dated Dec. 17, 2020.
Office Action of the Indian application No. 201917051248, dated Jan. 21, 2021.
First Office Action of the Canadian application No. 3066923, dated Feb. 12, 2021.
International Search Report in the international application No. PCT/CN2017/100902, dated Jun. 1, 2018.
Written Opinion of the International Search Authority in the international application No. PCT/CN2017/100902, dated Jun. 1, 2018.
Samsung. "Multiplexing NR-PDCCH and PDSCH" 3GPP TSG RAN WG1 Meeting #90 R1-1713615, Aug. 25, 2017 (Aug. 25, 2017), sections 1, 2.1 and 2.2.1-2.2.3.
Guangdong Oppo Mobile Telecom. "On Resource Sharing between PDCCH and PDSCH" 3GPP TSG RAN WG1 Meeting #90 R1-1713271, Aug. 25, 2017 (Aug. 25, 2017), entire document.
Zte: "Resource sharing between PDCCH and PDSCH"3GPP Draft: R1-1707163 Resource Sharingbetween PDCCH and PDSCH, 3rd Generation Partnership Project (3GPP). Mobilecompetence Centre : 650, Route Des Lucioles; F-06921 Sophia-Antipolis Cedex: France vol. RAN WG1, No. Hangzhou, China; May 15, 2017-May 19, 2017 May 14, 2017 (May 14, 2017), XP051272378, Retrieved from the Internet: URL: http://www.3gpp. org/ftp/Meet ings 3GPP SYNC/RAN1/Docs/.
NTT Docomo et al: "Resource sharing between PDCCH and PDSCH", 3GPP Draft; R1-1713933. 3rd Generation Partnership Project (3GPP), Mobilecompetence Centre; 650, Route Des Lucioles; F-06921 Sophia-Antipolis Cedex; France vol. RAN WG1, No. Prague, P.R. Czechia; Aug. 21, 2017-Aug. 25, 2017 Aug. 20, 2017 (Aug. 20, 2017), XP051316725, Retrieved from ths Internet: URL: http//www.3gpp. org/ftp/Meetings 3GPP SYNC/RAN1/Docs/[ retrieved on Aug. 20, 2017] *section 2*.
Qualcomm Incorporated: "Resource reuse for data in DL control region", 3GPP Draft; R1-1708612 Resource Reuse Fordata in DL Control Regton. 3rd Generation Partnership Project (3GPP). Mobilecompetence Centre; 650, Route Des Lucioles; F-06921 Sophia-Antipolis Cedex; FR, vol. RAN WG1, No. Hangzhou; May 15, 2017-May 19, 2017 May 14, 2017 (May 14, 2017), XP051273801, Retrieved from the Internet:URL:http://www.3gpp.org/ftp/Meetings_3GPP_SYNC/RAN1/Docs/.
NTT Docomo et al: "Resource sharing between data and control channels", 3GPP Draft; R1-1711093, 3rd Generation Partnership Project (3GPP), Mobile Competence Centre; 650, Route Des Lucioles, F-06921 Sophia-Antipolis Cedex; France, vol. RAN WG1, No. Qingdao, P.R. China; Jun. 27, 2017-Jun. 30, 2017 Jun. 26, 2017 (Jun. 26, 2017), XP051300293, Retrieved from the Internet; URL: http//www.3gpp.org/ftp/Meetings 3GPP SYNC/RAN1/Docs/ [retrieved on Jun. 26, 2017] * the whole document *.
First Office Action of the Chinese application No. 201780090734.5, dated Jun. 19, 2020.
Supplementary European Search Report in the European application No. 17924137.7, dated Jun. 9, 2020.
First Office Action of the Russian application No. 2020100198, dated Aug. 21, 2020.
English Translation of the Written Opinion of the International Search Authority in the international application No. PCT/CN2017/100902, dated Jun. 1, 2018.
Second Office Action of the Chinese application No. 201780090734.5, dated Sep. 7, 2020.
Third Office Acton of the European application No. 17924137.7, dated Sep. 30, 2021.
Written Opinion of the Singaporean application No. 11201912262P, dated Sep. 13, 2021.
Second Office Action of the European application No. 17924137.7, dated May 28, 2021.
Second Office Action of the Canadian application No. 3066923, dated Dec. 31, 2021.

* cited by examiner

INFORMATION TRANSMISSION METHOD, DEVICE, AND SYSTEM

RELATED APPLICATION

This application is an application under 35 U.S.C. 371 of International Application No. PCT/CN2017/100902 filed on Sep. 7, 2017, the entire contents of which are incorporated herein by reference.

TECHNICAL FIELD

The disclosure relates to the technical field of wireless communications, and particularly to a method, device and system for information transmission.

BACKGROUND

With the development of communication technologies, researches on 5th generation wireless communication system (5G) have been made. Radio access in 5G is called new radio (NR). In a long term evolution (LTE) system, a physical downlink control channel (PDCCH) is transmitted in a control region of the system. The control region of the system occupies a whole system bandwidth and occupies 1 to 4 symbols. The specific number of symbols is notified to a terminal through a physical control format indicator channel (PCFICH). In a 5G NR technology, the concept of control REsource SET (CORESET) is introduced. A PDCCH can be transmitted in a CORESET. The CORESET occupies 1 to 3 symbols in a time domain and occupies a configured bandwidth rather than a whole system bandwidth in a frequency domain. Therefore, for example, for time-frequency resource blocks (RBs), a shape representing resource elements (REs) occupied by the CORESET may be more complex than a shape representing REs occupied by the PDCCH in the LTE system. A frequency-domain bandwidth resource and a number of time-domain symbols occupied by the CORESET may be configured for a terminal through high-layer signaling.

A search space of each terminal is defined in a CORESET, and a PDCCH of the terminal is transmitted on PDCCH candidates in the search space.

In order to improve a utilization rate of resources, a resource that is not used for a PDCCH in 5G NR may be shared with a physical downlink shared channel (PDSCH). Therefore, a terminal needs to know whether a PDCCH of another user exists in its own PDSCH, so as to serve as a basis for PDSCH rate matching of the terminal.

SUMMARY

In order to solve the technical problem, embodiments of the disclosure are intended to provide a method, device and system for information transmission, which enables a terminal to learn whether a PDCCH of another terminal exists in a PDSCH resource received by the terminal, thereby providing a basis for PDSCH rate matching of the terminal.

The technical solutions of the embodiments of the disclosure are implemented as follows.

According to a first aspect, the embodiments of the disclosure provide a method for information transmission, which includes the following operations.

Indication information for a target terminal is generated, where the indication information is to indicate at least one of: existence states of PDCCHs of one or more non-target terminals in a PDSCH transmitted to the target terminal, or resource occupation states of the one or more non-target terminals in the PDSCH transmitted to the target terminal.

The indication information is transmitted to the target terminal.

According to a second aspect, the embodiments of the disclosure provide a method for information transmission, which includes the following operations. A terminal receives indication information, where the indication information is to indicate at least one of: existence states of PDCCHs of one or more other terminals in a PDSCH transmitted to the terminal, or resource occupation states of the one or more other terminals in the PDSCH transmitted to the terminal.

The terminal performs rate matching on the PDSCH transmitted to the terminal based on the indication information.

According to a third aspect, the embodiments of the disclosure provide a network device, which includes a generation portion and a transmission portion. The generation portion may be configured to generate indication information for a target terminal, where the indication information is to indicate existence states of PDCCHs of one or more non-target terminals in a PDSCH transmitted to the target terminal, or resource occupation states of the one or more non-target terminals in the PDSCH transmitted to the target terminal.

The transmission portion may be configured to transmit the indication information to the target terminal.

According to a fourth aspect, the embodiments of the disclosure provide a terminal, which includes a receiving portion and a rate matching portion.

The receiving portion may be configured to receive indication information, where the indication information is to indicate at least one of: existence states of PDCCHs of one or more other terminals in a PDSCH transmitted to the terminal, or resource occupation states of the one or more other terminals in the PDSCH transmitted to the terminal.

The rate matching portion may be configured to perform rate matching on the PDSCH transmitted to the terminal according to the indication information.

According to a fifth aspect, the embodiments of the disclosure provide a computer-readable medium having stored therein an information transmission program that, when executed by at least one processor, causes the at least one processor to implement any method in the first aspect.

According to a sixth aspect, the embodiments of the disclosure provide a computer-readable medium having stored therein an information transmission program that, when executed by at least one processor, causes the at least one processor to implement any method in the second aspect.

According to a seventh aspect, the embodiments of the disclosure provide a network device, which includes a first network interface, a first memory and a first processor.

The first network interface may be configured to receive and send a signal in a process of receiving and transmitting information with another external network element.

The first memory may be configured to store a computer program capable of running in the first processor.

The first processor may be configured to run the computer program to execute any method in the first aspect.

According to an eighth aspect, the embodiments of the disclosure provide a terminal, which includes a second network interface, a second memory and a second processor.

The second network interface may be configured to receive and send a signal in a process of receiving and transmitting information with another external network element.

The second memory may be configured to store a computer program capable of running in the second processor.

The second processor may be configured to run the computer program to execute any method in the second aspect.

According to a ninth aspect, the embodiments of the disclosure provide a system for information transmission, which includes a network device and a terminal.

The network device may be configured to generate indication information for the terminal, where the indication information is to indicate at least one of: existence states of PDCCHs of one or more other terminals in a PDSCH transmitted to the terminal, or resource occupation states of the one or more other terminals in the PDSCH transmitted to the terminal, and transmit the indication information to the terminal.

The terminal may be configured to receive the indication information and perform rate matching on the PDSCH transmitted to the terminal based on the indication information.

The embodiments of the disclosure provide the method, device and system for information transmission. The network device may carry the indication information through PDCCH signaling or radio resource control (RRC) signaling to enable the terminal to learn at least one of: whether PDCCHs of the one or more other terminals exist in the PDSCH transmitted to the terminal, or whether resources in the PDSCH transmitted to the terminal are occupied by the one or more other terminals. Therefore, PDSCH rate matching may be performed based on a content learned from the indication information to avoid the condition that a PDSCH data packet may not be correctly parsed in a short time period due to a matching error.

DETAILED DESCRIPTION

The technical solutions in the embodiments of the disclosure will be described clearly and completely below in combination with the drawings in detail.

Figure 1:
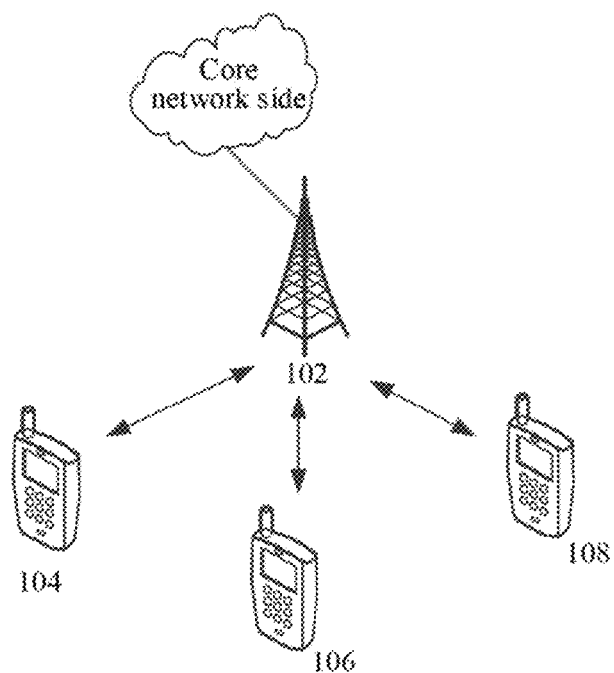
FIG. 1 is a structure diagram of a communication system according to an embodiment of the disclosure.

Referring to FIG. 1, an exemplary simplified structure of a communication system is illustrated. It is to be pointed out that the system illustrated in FIG. 1 is only a system example that the embodiments of the disclosure may be applied to and the technical solutions of the embodiments of the disclosure may be implemented in any system in various systems according to a practical requirement. As illustrated in FIG. 1, the wireless system may include a core network side, a base station and user equipment (UE). In FIG. 1, the base station 102 may communicate with one or more UEs such as UE 104, UE 106 and UE 108, etc. through a transmission medium and provide an access point to the core network side for the UE 104, UE 106 and UE 108, etc. Therefore, the base station 102 in an LTE system may be an evolved node B (eNB), and the base station 102 in 5G NR may be a gNB. Examples of the UE 104, UE 106 and UE 108 may include a cell phone, a smart phone, a session initiation protocol (SIP) phone, a laptop computer, a personal digital assistant (PDA), satellite ratio, a global positioning system, a multimedia device, a video device, a digital audio player (for example, a moving picture experts group audio layer-3 (MP3) player), a camera, a game console, a tablet computer or any other device with a similar function. The UE 104, UE 106 and UE 108 may also be called, by those skilled in the art, a terminal, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client or some other proper terms.

Figure 2:
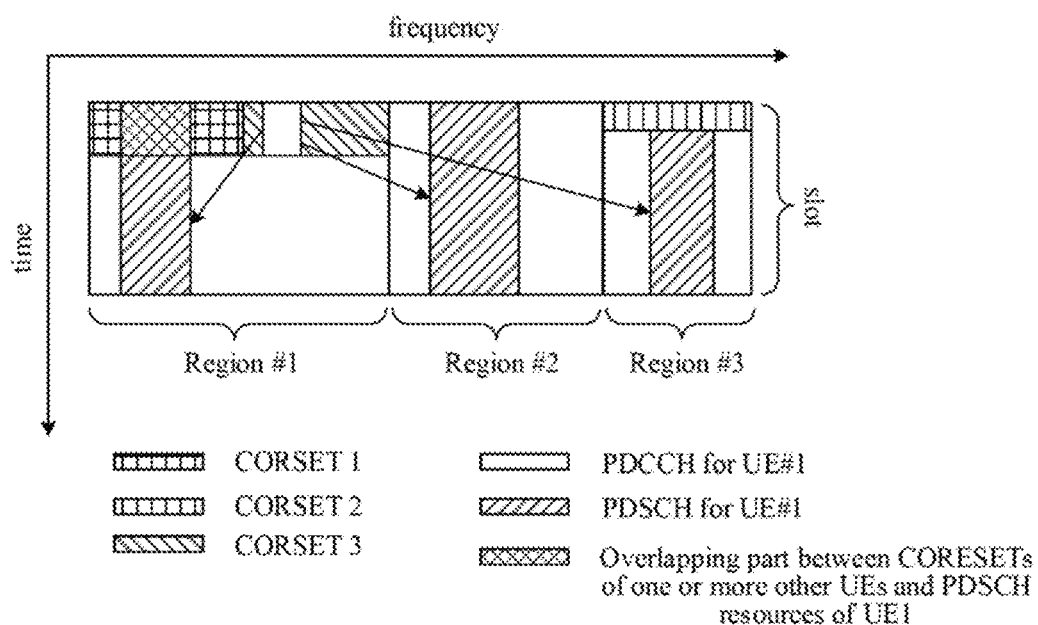
FIG. 2 is a schematic diagram of time-frequency resources according to an embodiment of the disclosure.

Referring to a schematic diagram of time-frequency resources illustrated in FIG. 2, since PDCCH and PDSCH can share resources in 5G NR, a PDSCH transmitted to UE by a base station may include PDCCHs of one or more other terminals, may also include a PDCCH of the UE only and may also include no PDCCH. As illustrated in FIG. 2, taking UE #1 as an example, a PDCCH of UE #1 is located in CORESET3. When a network schedules a PDSCH of UE #1 in region 1 and a starting symbol of the PDSCH is a first symbol in a slot, the PDSCH includes a CORESET of other UEs. When the network schedules the PDSCH of UE #1 in region 2, the PDSCH does not include a CORESET of any UE. When the network schedules the PDSCH of UE #1 in region 3 and the starting symbol is greater than a last symbol occupied by CORESET2, the PDSCH does not include the CORESET of other UEs.

It may be understood that, when the PDSCH of UE #1 includes PDCCHs of one or more other UEs, PDSCH rate matching of UE #1 may be affected to cause the condition that a PDSCH data packet may not be correctly parsed in a short time period. For avoiding such a condition, the following embodiments are proposed.

First Embodiment

Figure 3:
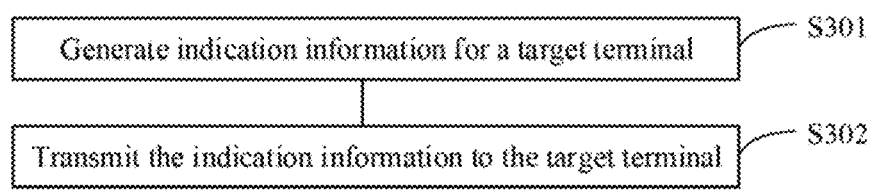
FIG. 3 is a flowchart of a method for information transmission according to an embodiment of the disclosure.

Referring to FIG. 3, a method for information transmission provided in the embodiment of the disclosure is illustrated. The method may be applied to a network device in a network system, for example, a gNB in 5G NR. The method may include the following operations.

At block S301, indication information for a target terminal is generated.

The indication information is to indicate at least one of: existence states of PDCCHs of one or more non-target terminals in a PDSCH transmitted to the target terminal, or resource occupation states of the one or more non-target terminals in the PDSCH transmitted to the target terminal.

It is to be explained that, in the embodiment and subsequent embodiments, for the target terminal, any other terminal other than the target terminal in the communication system may be called a "non-target terminal" and the non-target terminal will not be elaborated in the embodiment and the subsequent embodiments.

At block S302, the indication information is transmitted to the target terminal.

It may be understood that the target terminal, after receiving the indication information, may learn whether the PDSCH transmitted to the terminal includes PDCCHs of one or more other terminals based on the indication information and the terminal may perform PDSCH rate matching based on the learned content, thereby reducing matching errors to avoid the condition that a PDSCH data packet may not be correctly parsed in a short time period due to the matching errors.

For the technical solution illustrated in FIG. 3, in a first possible implementation, the indication information includes one bit in PDCCH signaling, and a value of the bit is used for representing at least one of: whether the PDCCHs of the one or more non-target terminals exist in the PDSCH transmitted to the target terminal, or whether resources in the PDSCH transmitted to the target terminal are occupied by the one or more non-target terminals.

Specifically, the bit may represent, through bit values 0 and 1, at least one of: whether the PDCCHs of the one or more non-target terminals exist in the PDSCH transmitted to the target terminal, or whether resources in the PDSCH transmitted to the target terminal are occupied by the one or more non-target terminals. For example, when the value of the bit is 0, it is represented at least one of: no PDCCH of the one or more non-target terminals exists in the PDSCH transmitted to the target terminal, or no resource in the PDSCH transmitted to the target terminal is occupied by the one or more non-target terminals. When the value of the bit is 1, it is represented at least one of: the PDCCHs of the one or more non-target terminals exist in the PDSCH transmitted to the target terminal, or the resources in the PDSCH transmitted to the target terminal are occupied by the one or more non-target terminals. It may be understood that, in another example, it may also be represented, through the bit value 1, that at least one of: no PDCCH of the one or more non-target terminals exists in the PDSCH transmitted to the target terminal, or no resource in the PDSCH transmitted to the target terminal is occupied by the one or more non-target terminals and represented, through the bit value 0, that at least one of: the PDCCHs of the one or more non-target terminals exist in the PDSCH transmitted to the target terminal, or the resources in the PDSCH transmitted to the target terminal are occupied by the one or more non-target terminals. There are no elaborations made thereto in the embodiment. However, for conveniently understanding the technical solution, the bit value and content represented by the bit value in the first example in the two examples are adopted in the embodiment of the disclosure.

For the technical solution illustrated in FIG. 3, in a second possible implementation, the indication information includes N bits in the PDCCH signaling, N being greater than 1, each bit corresponds to a respective one of the one or more non-target terminals, and each bit is used for representing at least one of: whether a PDCCH of the non-target terminal corresponding to the bit exists in the PDSCH transmitted to the target terminal, or whether a resource in the PDSCH transmitted to the target terminal is occupied by the non-target terminal corresponding to the bit.

Specifically, each bit may represent, through bit values 0 and 1, at least one of: whether the PDCCH of the corresponding non-target terminal exists in the PDSCH transmitted to the target terminal, or whether a resource in the PDSCH transmitted to the target terminal is occupied by the corresponding non-target terminal. For example, when a value of the bit is 0, it is represented that at least one of: no PDCCH of the non-target terminal corresponding to the bit exists in the PDSCH transmitted to the target terminal, or no resource in the PDSCH transmitted to the target terminal is occupied by the non-target terminal corresponding to the bit; and when the value of the bit is 1, it is represented at least one of a PDCCH of the non-target terminal corresponding to the bit exists in the PDSCH transmitted to the target terminal, or a resource in the PDSCH transmitted to the target terminal is occupied by the non-target terminal corresponding to the bit. It may be understood that, in another example, it may also be represented, through the bit value 1, that at least one of: no PDCCH of the non-target terminal corresponding to the bit exists in the PDSCH transmitted to the target terminal, or no resource in the PDSCH transmitted to the target terminal is occupied by the non-target terminal corresponding to the bit and represented, through the bit value 0, that at least one of: the PDCCH of the non-target terminal corresponding to the bit exists in the PDSCH transmitted to the target terminal, or a resource in the PDSCH transmitted to the target terminal is occupied by the non-target terminal corresponding to the bit. There are no elaborations made thereto in the embodiment. However, for conveniently understanding the technical solution, the bit value and content represented by the bit value in the first example in the two examples are adopted in the embodiment of the disclosure.

It is to be noted that, in the two possible implementations, the indication information is carried through the PDCCH signaling. Specifically, the PDCCH signaling may include downlink control information (DCI). There are no elaborations made thereto in the embodiment.

In addition, for the technical solution illustrated in FIG. 3, in a third possible implementation, the indication information includes one bit in RRC signaling. A value of the bit is used for representing at least one of: whether PDCCHs of the one or more non-target terminals exist in the PDSCH transmitted to the target terminal, or whether resources in the PDSCH transmitted to the target terminal are occupied by the one or more non-target terminals.

For the technical solution illustrated in FIG. 3, in a fourth possible implementation, the indication information includes N bits in the RRC signaling, N being greater than 1, each bit corresponds to a respective one of the one or more non-target terminals, and each bit is used for representing at least one of: whether a PDCCH of the non-target terminal corresponding to the bit exists in the PDSCH transmitted to the target terminal, or whether a resource in the PDSCH transmitted to the target terminal is occupied by the non-target terminal corresponding to the bit.

Specifically, in the third and fourth implementations, a meaning of the value of the bit in the RRC signaling is the same as the meaning of the value of the bit in the PDCCH signaling described in the first and second implementations and will not be elaborated herein.

It is to be noted that, since the indication information is carried through the RRC signaling, before receiving RRC signaling indicating a change of the indication information, for example, RRC signaling carrying new indication information, the target terminal may determine, based on the indication information carried through the present RRC signaling, at least one of: whether PDCCHs of one or more non-target terminals exist in the PDSCH transmitted to the target terminal, or whether resources in the PDSCH transmitted to the target terminal are occupied by the one or more non-target terminals.

According to the above implementations, it may be seen that the network device, for example, the gNB, may carry the indication information through the PDCCH signaling or the RRC signaling to enable the terminal to learn at least one of: whether the PDCCHs of the one or more other terminals exist in the PDSCH transmitted to the terminal, or whether the resources in the PDSCH transmitted to the target terminal are occupied by the one or more other terminals. Therefore, PDSCH rate matching may be performed based on a content learned from the indication information to avoid the condition that a PDSCH data packet may not be correctly parsed in a short time period due to a matching error.

Second Embodiment

Figure 4:
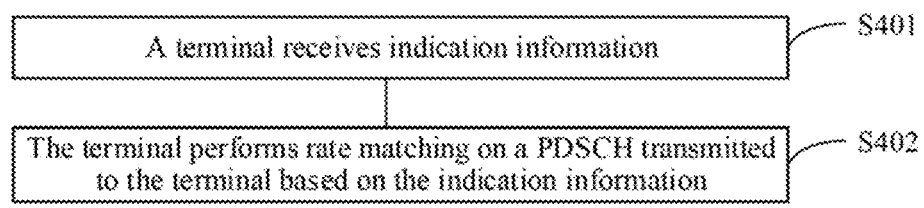
FIG. 4 is a flowchart of another method for information transmission according to an embodiment of the disclosure.

Based on the same inventive concept of the abovementioned embodiment, referring to FIG. 4, an information transmission method provided in the embodiment of the disclosure is illustrated. The method may be applied to a terminal in a network system. The method may include the following operations.

At block S401, the terminal receives indication information.

The indication information is to indicate at least one of: existence states of PDCCHs of one or more other terminals in a PDSCH transmitted to the terminal, or resource occupation states of the one or more other terminals in the PDSCH transmitted to the terminal.

At block S402, the terminal performs rate matching on the PDSCH transmitted to the terminal based on the indication information.

It may be understood that the terminal, after learning, through the indication information, at least one of: the existence states of the PDCCHs of the one or more other terminals in the PDSCH transmitted to the terminal or the resource occupation states of the one or more other terminals in the PDSCH transmitted to the terminal, may perform PDSCH rate matching based on the learned content, thereby reducing occurrence of matching errors to avoid the condition that a PDSCH data packet may not be correctly parsed in a short time period due to the matching errors.

For the technical solution illustrated in FIG. 4, in a first possible implementation, the indication information includes one bit in PDCCH signaling, and a value of the bit is used for representing at least one of: whether the PDCCHs of the one or more other terminals exists in the PDSCH transmitted to the terminal, or whether resources in the PDSCH transmitted to the terminal are occupied by the one or more other terminals.

Specifically, when the value of the bit is 0, it is represented at least one of: no PDCCH of the one or more other terminals exists in the PDSCH transmitted to the terminal, or no resource in the PDSCH transmitted to the terminal is occupied by the one or more other terminals; and when the value of the bit is 1, it is represented at least one of: the PDCCHs of the one or more other terminals exist in the PDSCH transmitted to the terminal, or the resources in the PDSCH transmitted to the terminal are occupied by the one or more other terminals. It may be understood that, in another example, it may also be represented, through the bit value 1, at least one of: no PDCCH of the one or more other terminals exists in the PDSCH transmitted to the terminal, or no resource in the PDSCH transmitted to the terminal is occupied by the one or more other terminals and represented, through the bit value 0, at least one of: the PDCCHs of the one or more other terminals exist in the PDSCH transmitted to the terminal, or the resources in the PDSCH transmitted to the terminal are occupied by the one or more other terminals. There are no elaborations made thereto in the embodiment. However, for conveniently understanding the technical solution, the bit value and content represented by the bit value in the first example in the two examples are adopted in the embodiment of the disclosure.

For the technical solution illustrated in FIG. 4, in a second possible implementation, the indication information includes N bits in the PDCCH signaling, N being greater than 1, each bit corresponds to a respective one of the one or more other terminals, and each bit is used for representing at least one of: whether a PDCCH of the other terminal corresponding to the bit exists in the PDSCH transmitted to the terminal, or whether a resource in the PDSCH transmitted to the terminal is occupied by the other terminal corresponding to the bit.

Specifically, each bit may represent, through bit values 0 and 1, at least one of: whether the PDCCH of the other terminal corresponding to the bit exists in the PDSCH transmitted to the terminal, or whether a resource in the PDSCH transmitted to the terminal is occupied by the other terminal corresponding to the bit. For example, when the value of the bit is 0, it is represented at least one of: no PDCCH of the other terminal corresponding to the bit exists in the PDSCH transmitted to the terminal, or no resource in the PDSCH transmitted to the terminal is occupied by the other terminal corresponding to the bit; and when the value of the bit is 1, it is represented at least one of: the PDCCH of the other terminal corresponding to the bit exists in the PDSCH transmitted to the terminal, or a resource in the PDSCH transmitted to the terminal is occupied by the other terminal corresponding to the bit. It may be understood that, in another example, it may also be represented, through the bit value 1, at least one of: no PDCCH of the other terminal corresponding to the bit exists in the PDSCH transmitted to the terminal, or no resource in the PDSCH transmitted to the terminal is occupied by the other terminal corresponding to the bit and represented, through the bit value 0, at least one of: the PDCCH of the other terminal corresponding to the bit exists in the PDSCH transmitted to the terminal, or the resource in the PDSCH transmitted to the terminal is occupied by the other terminal corresponding to the bit. There are no elaborations made thereto in the embodiment. However, for conveniently understanding the technical solution, the bit value and content represented by the bit value in the first example in the two examples are adopted in the embodiment of the disclosure.

It is to be noted that, in the two possible implementations, the indication information is carried through the PDCCH signaling. Specifically, the PDCCH signaling may be DCI. There are no elaborations made thereto in the embodiment.

In addition, for the technical solution illustrated in FIG. 4, in a third possible implementation, the indication information includes one bit in RRC signaling, and a value of the bit is used for representing at least one of: whether the PDCCHs of the one or more other terminals exist in the PDSCH transmitted to the terminal, or whether resources in the PDSCH transmitted to the terminal are occupied by the one or more other terminals.

For the technical solution illustrated in FIG. 4, in a fourth possible implementation, the indication information includes N bits in the RRC signaling, N being greater than 1, each bit corresponds to a respective one of the one or more other terminals, and each bit is used for representing at least one of: whether a PDCCH of the other terminal corresponding to the bit exists in the PDSCH transmitted to the terminal, or whether a resource in the PDSCH transmitted to the terminal is occupied by the other terminal corresponding to the bit.

Specifically, in the third and fourth implementations, a meaning of the value of the bit in the RRC signaling is the same as the meaning of the value of the bit in the PDCCH signaling described in the first and second implementations and will not be elaborated herein.

In the four implementations, specific solutions of carrying the indication information through two types of signaling are introduced. Based on different numbers of bits in the four implementations, different implementation processes may also be adopted for S402. The following two implementation processes may be included.

First Implementation

When the indication information includes one bit in the PDCCH signaling or the RRC signaling, the operation that the terminal performs rate matching on the PDSCH transmitted to the terminal based on the indication information may include the following operations.

When a value of the bit is 0, the terminal determines whether the PDSCH transmitted to the terminal includes a PDCCH configured to schedule the PDSCH according to preset correspondences between time-frequency resources of a PDSCH and time-frequency resources of a PDCCH configured to schedule the PDSCH.

If the PDSCH transmitted to the terminal includes the PDCCH configured to schedule the PDSCH, the terminal removes the PDCCH configured to schedule the PDSCH from the PDSCH transmitted to the terminal and then performs the rate matching.

If no PDCCH configured to schedule the PDSCH exists in the PDSCH transmitted to the terminal, the terminal directly performs the rate matching on the PDSCH transmitted to the terminal.

When the value of the bit is 1, the terminal removes resources occupied by PDCCHs of the one or more another terminals from the PDSCH transmitted to the terminal and then performs the rate matching.

In an implementation, after removing the resources occupied by the PDCCHs of the one or more other terminals from the PDSCH transmitted to the terminal, the terminal further removes a resource occupied by a PDCCH of the terminal from the PDSCH transmitted to the terminal. Therefore, the following operations may further be included.

The terminal determines whether the PDSCH transmitted to the terminal includes the PDCCH configured to schedule the PDSCH according to preset correspondences between time-frequency resources of the PDSCH and time-frequency resources of the PDCCH configured to schedule the PDSCH.

If the PDSCH transmitted to the terminal includes the PDCCH configured to schedule the PDSCH, the terminal removes the PDCCH configured to schedule the PDSCH from the PDSCH transmitted to the terminal.

If the PDSCH transmitted to the terminal does not include the PDCCH configured to schedule the PDSCH, the terminal directly performs rate matching on the PDSCH transmitted to the terminal.

Specifically, at first, the operation that the terminal removes the PDCCH configured to schedule the PDSCH from the PDSCH transmitted to the terminal may include the following operation.

The terminal removes a CORESET corresponding to the PDCCH configured to schedule the PDSCH from the PDSCH transmitted to the terminal or removes an RE occupied by the PDCCH configured to schedule the PDSCH from the PDSCH transmitted to the terminal according to a preset removal strategy. It is to be understood that a resource occupied by a CORESET corresponding to a PDCCH is usually more than an RE occupied by the PDCCH. Therefore, the terminal may learn the removal strategy by predetermining with a network side or by receiving notification information from the network side.

Then, the operation that the terminal removes the resourced occupied by the PDCCHs of the one or more other terminals from the PDSCH transmitted to the terminal may include the following operation.

The terminal removes resources occupied by CORESETs of the one or more other terminals from the PDSCH transmitted to the terminal. It is to be noted that the terminal may also learn information about CORESETs of the one or more other terminals through configuration information transmitted by the network side in advance and then may learn the resources occupied by the CORESETs of the one or more other terminals in advance.

Second Implementation

When the indication information includes N bits in the PDCCH signaling or the RRC signaling, the operation that rate matching is performed on the PDSCH transmitted to the terminal according to the indication information may include the following operations.

The terminal traverses values of all the bits.

When the values of all the bits are 0, the terminal determines whether the PDSCH transmitted to the terminal includes the PDCCH configured to schedule the PDSCH according to preset correspondences between time-frequency resources of the PDSCH and time-frequency resources of the PDCCH configured to schedule the PDSCH.

If the PDSCH transmitted to the terminal includes the PDCCH configured to schedule the PDSCH, the terminal removes the PDCCH configured to schedule the PDSCH from the PDSCH transmitted to the terminal and then performs rate matching.

If the PDSCH transmitted to the terminal does not include the PDCCH configured to schedule the PDSCH, the terminal directly performs rate matching on the PDSCH transmitted to the terminal.

When a value of at least one bit in all the bits is 1, the terminal removes a resource occupied by a PDCCH of the other terminal corresponding to the bit of which the value is 1 from the PDSCH transmitted to the terminal and then performs rate matching.

In an implementation, after removing the resource occupied by the PDCCH of the other terminal corresponding to the bit of which the value is 1 from the PDSCH transmitted to the terminal, the terminal further removes the resource occupied by the PDCCH of the terminal from the PDSCH transmitted to the terminal. Therefore, the following operations may further be included.

The terminal determines whether the PDSCH transmitted to the terminal includes the PDCCH configured to schedule the PDSCH according to the preset correspondences between the time-frequency resources of the PDSCH and the time-frequency resources of the PDCCH configured to schedule the PDSCH.

If the PDSCH transmitted to the terminal includes the PDCCH configured to schedule the PDSCH, the terminal removes the PDCCH configured to schedule the PDSCH from the PDSCH transmitted to the terminal.

If the PDSCH transmitted to the terminal does not include the PDCCH configured to schedule the PDSCH, the terminal directly performs rate matching on the PDSCH transmitted to the terminal.

It is to be noted that the operation that the terminal removes the resource occupied by the PDCCH of the other terminal corresponding to the bit of which the value is 1 from the PDSCH transmitted to the terminal may include the following operation.

The terminal removes a resource occupied by a CORESET of the other terminal corresponding to the bit of which the value is 1 from the PDSCH transmitted to the terminal.

It may be understood that the terminal, before performing rate matching on the PDSCH transmitted to the terminal, removes the resources occupied by the PDCCHs of the one or more other terminal from the PDSCH transmitted to the terminal through the two implementation processes, thereby reducing occurrence of matching errors to avoid the condition that a PDSCH data packet may not be correctly parsed in a short time period due to the matching errors.

Third Embodiment

The technical solutions of the abovementioned embodiments will be described below with specific examples in detail.

First Example

Figure 5:
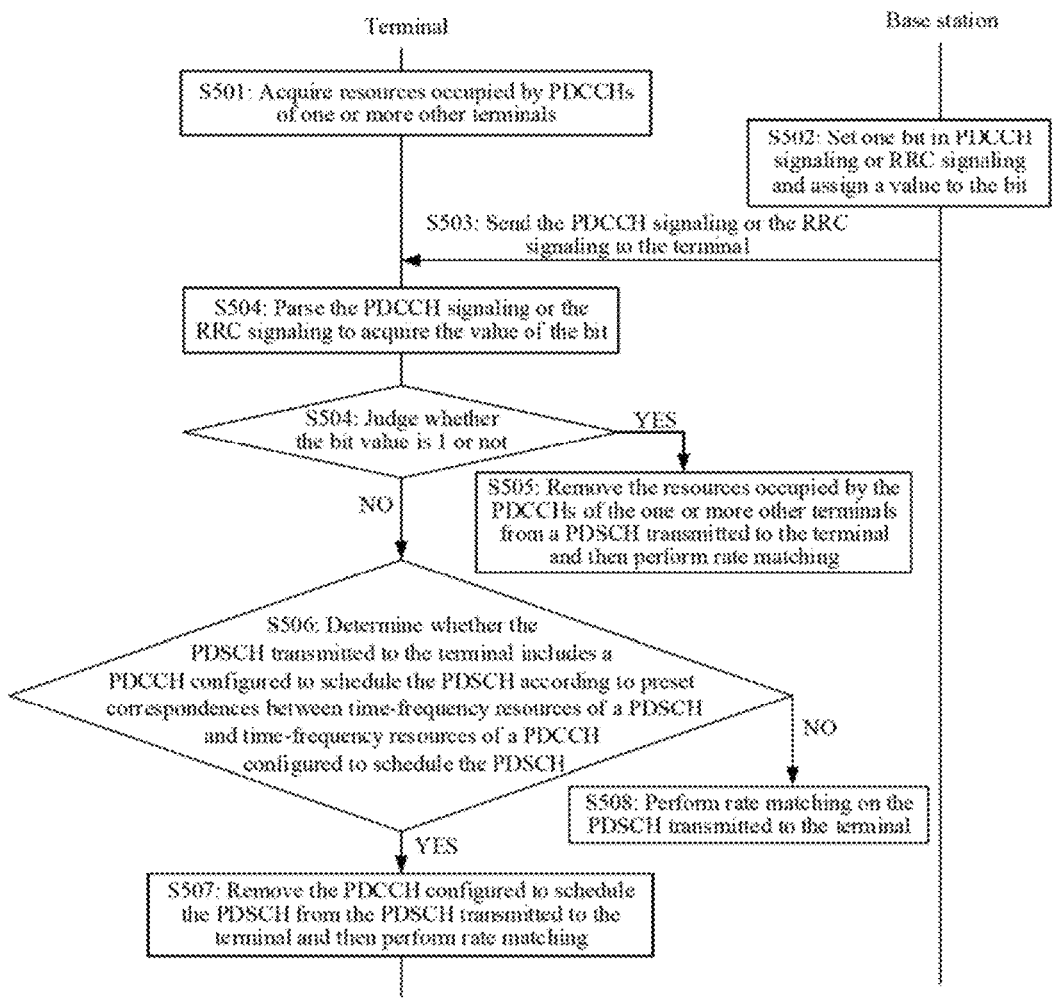
FIG. 5 is a flowchart of an example according to an embodiment of the disclosure.

In the example, the indication information includes only one bit, and thus the bit represents whether a PDSCH transmitted to a terminal includes PDCCHs of one or more other terminals. Referring to FIG. 5, a flow of the example is as follows.

In S501, a terminal acquires resources occupied by PDCCHs of the one or more other terminals.

Specifically, the terminal may acquire the resources occupied by the PDCCHs of the one or more other terminals, specifically resources occupied by CORESETs of the one or more other terminals, through pre-configuration of a network.

In S502, a base station sets one bit in PDCCH signaling or RRC signaling and assigns a value to the bit.

For example, the value of the bit is to represent at least one of: whether the PDCCHs of the one or more other terminals exist in a PDSCH transmitted to the terminal, or whether resources in the PDSCH transmitted to the terminal are occupied by the one or more other terminals. Specifically, when the value of the bit is 0, it is represented at least one of: no PDCCH of the one or more other terminals exists in the PDSCH transmitted to the terminal, or no resource in the PDSCH transmitted to the terminal is occupied by the one or more other terminals; and when the value of the bit is 1, it is represented at least one of: the PDCCHs of the one or more other terminals exist in the PDSCH transmitted to the terminal, or the resources in the PDSCH transmitted to the terminal is occupied by the one or more other terminals.

In S503, the base station sends the PDCCH signaling or the RRC signaling to the terminal.

In S504, the terminal parses the PDCCH signaling or the RRC signaling to acquire the value of the bit.

In S504, the terminal judges whether the value of the bit is 1, if YES, S505 is executed, and if NO, S506 is executed.

In S505, the terminal removes the resources occupied by the PDCCHs of the one or more other terminals from the PDSCH transmitted to the terminal and then performs rate matching.

In S506, the terminal determines whether the PDSCH transmitted to the terminal includes a PDCCH configured to schedule the PDSCH according to preset correspondences between time-frequency resources of a PDSCH and time-frequency resources of a PDCCH configured to schedule the PDSCH, if YES, S507 is executed, otherwise S508 is executed.

In S507, the terminal removes the PDCCH configured to schedule the PDSCH from the PDSCH transmitted to the terminal and then performs rate matching.

In S508, the terminal directly performs rate matching on the PDSCH transmitted to the terminal.

It is to be understood that S506 to S508 are for the operation that the terminal removes a resource occupied by a PDCCH of the terminal from the PDSCH transmitted to the terminal, so that, in a specific implementation process, after the resources occupied by the PDCCHs of the one or more other terminals are removed from the PDSCH transmitted to the terminal according to S505, removal of the resource occupied by the PDCCH of the terminal from the PDSCH transmitted to the terminal and final rate matching may further be implemented according to S506 to S508.

From the example, it may be seen that the terminal learns whether the PDSCH transmitted to the terminal includes the PDCCHs of the one or more other terminals through the received indication information and, after removing the PDCCHs of the one or more other terminals from the PDSCH transmitted to the terminal, performs rate matching, so that occurrence of matching errors may be reduced, and the condition that a PDSCH data packet may not be correctly parsed in a short time period due to the matching errors can be avoided.

Second Example

Figure 6:
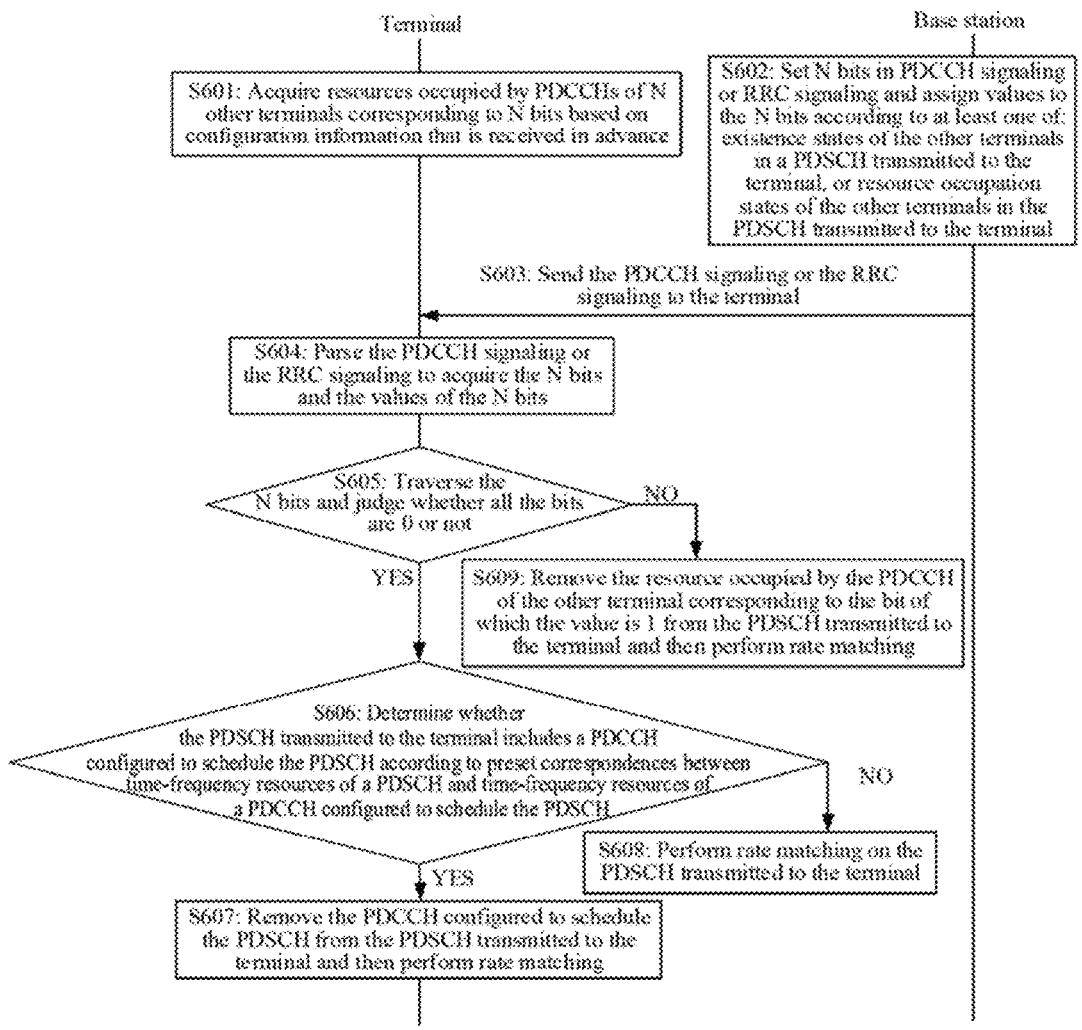
FIG. 6 is a flowchart of another example according to an embodiment of the disclosure.

In the example, the indication information includes N bits, N being greater than 1. Each bit corresponds to a respective one of one or more other terminals except the terminal. Referring to FIG. 6, a flow of the example is as follows.

In S601, a terminal acquires resources occupied by PDCCHs of N other terminals corresponding to N bits based on configuration information that is received in advance.

In S602, a base station sets N bits in PDCCH signaling or RRC signaling and assigns values to the N bits according to at least one of: existence states of the PDCCHs of the other terminals in a PDSCH transmitted to the terminal, or resource occupation states of the other terminals.

Specifically, each bit corresponds to a respective one of the one or more other terminals, and each bit is configured to represent at least one of: whether the PDCCH of the other terminal corresponding to the bit exists in the PDSCH transmitted to the terminal, or whether a resource in the PDSCH transmitted to the terminal is occupied by the other terminal corresponding to the bit. For example, when the value of a bit is 0, it is represented at least one of: no PDCCH of the other terminal corresponding to the bit exists in the PDSCH transmitted to the terminal, or no resource is occupied by the other terminal corresponding to the bit; and when the value of the bit is 0, it is represented at least one of: the PDCCH of the other terminal corresponding to the bit exists in the PDSCH transmitted to the terminal, or the resource in the PDSCH transmitted to the terminal is occupied by the other terminal corresponding to the bit.

For example, when the number of terminals under the coverage of the base station is 4, for a terminal X in the example, the number N of the other terminals is 3, the base station sets three bits in the PDCCH signaling or the RRC signaling and the other terminals are sequentially represented with A, B and C and correspond to the three bits in sequence respectively. Then, it may be obtained that, when the three bits are "000", it is indicated that PDCCHs of all the other terminals A, B and C do no occupy a PDSCH of the terminal X, when the three bits are "100", it is indicated that the PDCCH of A occupies the PDSCH of the terminal X while the PDCCHs of both B and C do not occupy the PDSCH of the terminal X, and so on. There are no elaborations made in the example.

In S603, the base station sends the PDCCH signaling or the RRC signaling to the terminal.

In S604, the terminal parses the PDCCH signaling or the RRC signaling to acquire the N bits and the values of the N bits.

In S605, the terminal traverses the N bits and judges whether the values of all the bits are 0, if YES, S606 to S608 are executed, and if NO, S609 is executed.

In S606, the terminal determines whether the PDSCH transmitted to the terminal includes a PDCCH configured to schedule the PDSCH according to preset correspondences between time-frequency resources of a PDSCH and time-frequency resources of a PDCCH configured to schedule the PDSCH, if YES, S607 is executed, otherwise S608 is executed.

In S607, the terminal removes the PDCCH configured to schedule the PDSCH from the PDSCH transmitted to the terminal and then performs rate matching.

In S608, the terminal directly performs rate matching on the PDSCH transmitted to the terminal.

In S609, the terminal removes the resource occupied by the PDCCH of the other terminal corresponding to the bit of which the value is 1 from the PDSCH transmitted to the terminal and then performs rate matching.

It is to be understood that S606 to S608 are for the operation that the terminal removes a resource occupied by a PDCCH of the terminal from the PDSCH transmitted to the terminal, so that, in a specific implementation process, after the resource occupied by the PDCCH of the other terminal is removed from the PDSCH transmitted to the terminal according to S609, removal of the resource occupied by the PDCCH of the terminal from the PDSCH transmitted to the terminal and final rate matching may further be implemented according to S606 to S608.

From the example, it may be seen that the terminal learns whether the PDSCH transmitted to the terminal includes the PDCCHs of one or more other terminals and the corresponding one or more other terminals through the received indication information and, after removing the PDCCHs of a corresponding number of other terminals from the PDSCH transmitted to the terminal, performs rate matching, so that occurrence of matching errors may be reduced, and the condition that a PDSCH data packet may not be correctly parsed in a short time period due to the matching errors is avoided.

Fourth Embodiment

Figure 7:
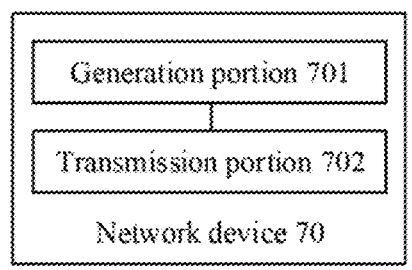
FIG. 7 is a composition schematic diagram of a network device according to an embodiment of the disclosure.

Based on the same inventive concept of the abovementioned embodiments, referring to FIG. 7, a network device 70 provided in the embodiment of the disclosure is illustrated. The network device 70 may be a gNB. The network device 70 includes a generation portion 701 and a transmission portion 702.

The generation portion 701 is configured to generate indication information for a target terminal, where the indication information is to indicate at least one of: existence states of PDCCHs of one or more non-target terminals in a PDSCH transmitted to the target terminal, or resource occupation states of the one or more non-target terminals in the PDSCH transmitted to the target terminal.

The transmission portion 702 is configured to transmit the indication information to the target terminal.

In a possible implementation, the indication information includes one bit in PDCCH signaling or RRC signaling, and a value of the bit is to represent at least one of: whether the PDCCHs of the one or more non-target terminals exist in the PDSCH transmitted to the target terminal, or whether resources in the PDSCH transmitted to the target terminal is occupied by the one or more non-target terminals.

In the implementation, when the bit value is 0, it is represented at least one of: no PDCCH of the one or more non-target terminals exists in the PDSCH transmitted to the target terminal, or no resource is occupied by the one or more non-target terminals; and when the bit value is 1, it is represented at least one of: the PDCCHs of the one or more non-target terminals exist in the PDSCH transmitted to the non-target terminal, or the resources in the PDSCH transmitted to the target terminal are occupied by the one or more non-target terminals.

In a possible implementation, the indication information includes N bits in the PDCCH signaling or the RRC signaling, N being greater than 1. Each bit corresponds to a respective one of the one or more non-target terminals, and each bit is configured to represent at least one of: whether a PDCCH of the corresponding non-target terminal exists in the PDSCH transmitted to the target terminal, or whether a resource in the PDSCH transmitted to the target terminal is occupied by the corresponding non-target terminal.

In the implementation, when the value of a bit is 0, it is represented at least one of: no PDCCH of the non-target terminal corresponding to the bit exists in the PDSCH transmitted to the target terminal, or no resource in the PDSCH transmitted to the target terminal is occupied by the non-target terminal corresponding to the bit; and when the value of the bit is 1, it is represented at least one of: the PDCCH of the non-target terminal corresponding to the bit exists in the PDSCH transmitted to the target terminal, or the resource in the PDSCH transmitted to the target terminal is occupied by the non-target terminal corresponding to the bit.

In the implementation, the PDCCH signaling includes DCI.

It may be understood that, in the embodiment, "portion" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product. The computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a read-only memory (ROM), a random access memory (RAM), a magnetic disk or an optical disk.

Therefore, the embodiment provides a computer-readable medium, which stores an information transmission program, the information transmission program being executed by at least one processor to implement the following operations.

Indication information for a target terminal is generated, where the indication information is to indicate at least one of: existence states of PDCCHs of one or more non-target terminals in a PDSCH transmitted to the target terminal, or resource occupation states of the one or more non-target terminals in the PDSCH transmitted to the target terminal.

The indication information is transmitted to the target terminal.

As another embodiment, the indication information includes one bit in PDCCH signaling or RRC signaling, and a value of the bit is to represent at least one of: whether the PDCCHs of the one or more non-target terminals exist in the PDSCH transmitted to the target terminal, or whether resources in the PDSCH transmitted to the target terminal are occupied by the one or more non-target terminals.

In the optional embodiment, when the bit value is 0, it is represented at least one of: no PDCCH of the one or more non-target terminals exists in the PDSCH transmitted to the target terminal, or no resource is occupied by the one or more non-target terminal; and when the bit value is 1, it is represented at least one of: the PDCCHs of the one or more non-target terminals exist in the PDSCH transmitted to the target terminal, or the resources in the PDSCH transmitted to the target terminal are occupied by the one or more non-target terminals.

As another embodiment, the indication information includes N bits in the PDCCH signaling or the RRC signaling, where N is greater than 1. Each bit corresponds to a respective one of the one or more non-target terminals, and each bit is configured to represent at least one of: whether a PDCCH of the corresponding non-target terminal exists in the PDSCH transmitted to the target terminal, or whether a resource in the PDSCH transmitted to the target terminal is occupied by the corresponding non-target terminal.

In the optional embodiment, when the value of a bit is 0, it is represented at least one of: no PDCCH of the non-target terminal corresponding to the bit exists in the PDSCH transmitted to the target terminal, or no resource in the PDSCH transmitted to the target terminal is occupied by the non-target terminal corresponding to the bit; and when the value of the bit is 1, it is represented at least one of: the PDCCH of the non-target terminal corresponding to the bit exists in the PDSCH transmitted to the target terminal, or a resource in the PDSCH transmitted to the target terminal is occupied by the non-target terminal corresponding to the bit.

As another embodiment, the RRC signaling includes DCI

Figure 8:
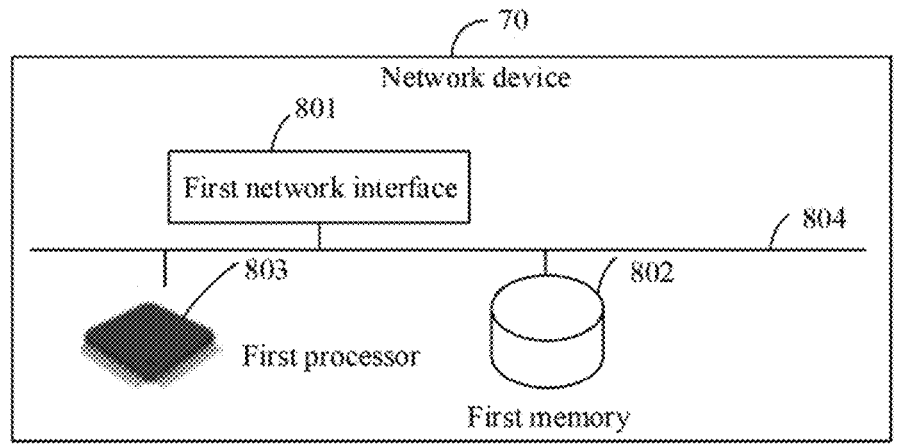
FIG. 8 is a hardware structure diagram of a network device according to an embodiment of the disclosure.

Based on the network device 70 and the computer-readable medium, referring to FIG. 8, a specific hardware structure of the network device 70 provided in the embodiment of the disclosure is illustrated, which may include: a first network interface 801, a first memory 802 and a first processor 803. All components are coupled together through a bus system 804. It may be understood that the bus system 804 is configured to implement connection communication between these components. The bus system 804 includes a data bus and further includes a power bus, a control bus and a state signal bus. However, for clear description, various buses in FIG. 8 are marked as the bus system 804. The first network interface 801 is configured to receive and send a signal in a process of receiving and transmitting information with another external network element.

The first memory 802 is configured to store a computer program capable of running in the first processor 803.

The first processor 803 is configured to run the computer program to execute the following operations.

Indication information for a target terminal is generated, where the indication information is to indicate at least one of: existence states of PDCCHs of one or more non-target terminals in a PDSCH transmitted to the target terminal, or resource occupation states of the one or more non-target terminal in the PDSCH transmitted to the target terminal.

The indication information is transmitted to the target terminal.

It may be understood that the first memory 802 in the embodiment of the disclosure may be a volatile memory or a nonvolatile memory, or may include both the volatile and nonvolatile memories. The nonvolatile memory may be a ROM, a programmable ROM (PROM), an erasable PROM (EPROM), an electrically EPROM (EEPROM) or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ES-DRAM), a synchlink DRAM (SLDRAM) and a direct rambus RAM (DRRAM). It is to be noted that the first memory 802 of a system and method described in the disclosure is intended to include, but not limited to, memories of these and any other proper types.

The first processor 803 may be an integrated circuit chip with a signal processing capability. In an implementation process, each operation of the method may be completed by an integrated logic circuit of hardware in the first processor 803 or an instruction in a software form. The first processor 803 may be a universal processor, a digital signal processor (DSP), an application specific integrated circuit (ASIC), a field programmable gate array (FPGA) or another programmable logic device (PLD), discrete gate or transistor logical device and discrete hardware component. Each method, operation and logical block diagram disclosed in the embodiment of the disclosure may be implemented or executed. The universal processor may be a microprocessor or the processor may also be any conventional processor and the like. The operations of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 802. The first processor 803 reads information from the first memory 802 and completes the operations of the method in combination with hardware.

It may be understood that these embodiments described in the disclosure may be implemented by hardware, software, firmware, middleware, a microcode or a combination thereof. In case of implementation with the hardware, the processing unit may be implemented in one or more ASICs, DSPs, DSPDs, PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the indication information includes one bit in PDCCH signaling or RRC signaling, and a value of the bit is configured to represent at least one of: whether the PDCCHs of the one or more non-target terminals exist in the PDSCH transmitted to the target terminal, or whether resources are occupied by the one or more non-target terminals.

In the optional embodiment, when the bit value is 0, it is represented at least one of: no PDCCH of the one or more non-target terminals exists in the PDSCH transmitted to the target terminal, or no resource in the PDSCH transmitted to the target terminal is occupied by the one or more non-target terminals; and when the bit value is 1, it is represented at least one of: the PDCCHs of the one or more non-target terminals exist in the PDSCH transmitted to the target terminal, or the resources in the PDSCH transmitted to the target terminal are occupied by the one or more non-target terminals.

Optionally, as another embodiment, the indication information includes N bits in the PDCCH signaling or the RRC signaling, where N is greater than 1. Each bit corresponds to a respective one of the one or more non-target terminals, and each bit is configured to represent at least one of: whether a PDCCH of the corresponding non-target terminal exists in the PDSCH transmitted to the target terminal, or whether a resource in the PDSCH transmitted to the target terminal is occupied by the corresponding non-target terminal.

In the optional embodiment, when the value of a bit is 0, it is represented at least one of: no PDCCH of the non-target terminal corresponding to the bit exists in the PDSCH transmitted to the target terminal, or no resource is occupied by the non-target terminal corresponding to the bit; and when the value of the bit is 0, it is represented at least one of: the PDCCH of the non-target terminal corresponding to the bit exists in the PDSCH transmitted to the target terminal, or a resource in the PDSCH transmitted to the target terminal is occupied by the non-target terminal corresponding to the bit.

Optionally, as another embodiment, the RRC signaling includes DCI

Fifth Embodiment

Figure 9:
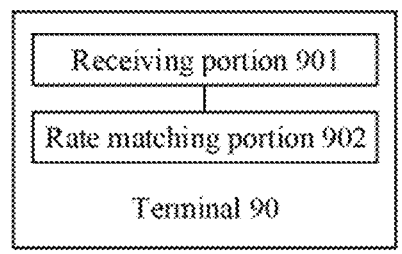
FIG. 9 is a composition diagram of a terminal according to an embodiment of the disclosure.

Based on the same inventive concept of the abovementioned embodiments, referring to FIG. 9, a structure of a terminal 90 provided in the embodiment of the disclosure is illustrated, which may include a receiving portion 901 and a rate matching portion 902.

The receiving portion 901 is configured to receive indication information, where the indication information is to indicate at least one of: existence states of PDCCHs of one or more other terminals in a PDSCH transmitted to the terminal 90, or resource occupation states of the one or more other terminals in the PDSCH transmitted to the terminal 90.

The rate matching portion 902 is configured to perform rate matching on the PDSCH transmitted to the terminal 90 based on the indication information.

In a possible implementation, the indication information includes one bit in PDCCH signaling or RRC signaling, and a value of the bit is configured to represent at least one of: whether the PDCCHs of the one or more other terminals exist in the PDSCH transmitted to the terminal 90, or whether resources in the PDSCH transmitted to the target terminal are occupied by the one or more other terminals.

In the implementation, when the bit value is 0, it is represented at least one of: no PDCCH of the one or more other terminals exists in the PDSCH transmitted to the terminal 90, or no resource in the PDSCH transmitted to the terminal is not occupied by the one or more other terminals; and when the bit value is 1, it is represented at least one of: the PDCCHs of the one or more other terminals exist in the PDSCH transmitted to the terminal 90, or the resources in the PDSCH transmitted to the terminal are occupied by the one or more other terminals.

In the implementation, the rate matching portion 902 is configured to:

when the value of the bit is 1, remove resources occupied by the PDCCHs of the one or more other terminals from the PDSCH transmitted to the terminal 90 and then perform rate matching; and when the value of the bit is 0 or after the resources occupied by the PDCCHs of the one or more other terminals is removed from the PDSCH transmitted to the terminal 90, determine whether the PDSCH transmitted to the terminal 90 includes a PDCCH configured to schedule the PDSCH according to preset correspondences between time-frequency resources of a PDSCH and time-frequency resources of a PDCCH configured to schedule the PDSCH, if the PDSCH transmitted to the terminal 90 includes the PDCCH configured to schedule the PDSCH, remove the PDCCH configured to schedule the PDSCH from the PDSCH transmitted to the terminal 90 and then perform rate matching, and if the PDSCH transmitted to the terminal 90 does not include the PDCCH configured to schedule the PDSCH, directly perform rate matching on the PDSCH transmitted to the terminal 90.

In the implementation, the rate matching portion 902 is configured to:

remove a CORESET corresponding to the PDCCH configured to schedule the PDSCH from the PDSCH transmitted to the terminal 90 or remove an RE occupied by the PDCCH configured to schedule the PDSCH from the PDSCH transmitted to the terminal 90 according to a preset removal strategy.

In the implementation, the rate matching portion 902 is configured to:

remove resources occupied by CORESETs of the one or more other terminals from the PDSCH transmitted to the terminal 90.

In a possible implementation, the indication information includes N bits in the PDCCH signaling or the RRC signaling, where N is greater than 1. Each bit corresponds to a respective one of the one or more other terminals, and each bit is configured to represent at least one of: whether a PDCCH of the corresponding other terminal exists in the PDSCH transmitted to the terminal 90, or whether a resource in the PDSCH transmitted to the terminal is occupied by the corresponding other terminal.

In the implementation, when the value of a bit is 0, it is represented at least one of: no PDCCH of the other terminal corresponding to the bit exists in the PDSCH transmitted to the terminal 90, or no resource is occupied by the other terminal corresponding to the bit; and when the value of the bit is 1, it is represented at least one of: the PDCCH of the other terminal corresponding to the bit exists in the PDSCH transmitted to the terminal 90, or the resource in the PDSCH transmitted to the terminal is occupied by the other terminal corresponding to the bit.

In the implementation, the rate matching portion 902 is configured to:

traverse values of all the bits;

when a value of at least one bit in all the bits is 1, remove a resource occupied by the PDCCH of the other terminal corresponding to the bit of which the bit value is 1 from the PDSCH transmitted to the terminal 90 and then perform rate matching; and when the values of all the bits are 0 or after the resource occupied by the PDCCH of the other terminal corresponding to the bit of which the bit value is 1 is removed from the PDSCH transmitted to the terminal 90, determine whether the PDSCH transmitted to the terminal 90 includes a PDCCH configured to schedule the PDSCH according to preset correspondences between time-frequency resources of a PDSCH and time-frequency resources of a PDCCH configured to schedule the PDSCH, if the PDSCH transmitted to the terminal 90 includes the PDCCH configured to schedule the PDSCH, remove the PDCCH configured to schedule the PDSCH from the PDSCH transmitted to the terminal 90 and then perform rate matching, and if the PDSCH transmitted to the terminal 90 does not include the PDCCH configured to schedule the PDSCH, directly perform rate matching on the PDSCH transmitted to the terminal 90.

In the implementation, the rate matching portion 902 is configured to:

remove a resource occupied by a CORESET of the other terminal corresponding to the bit of which the bit value is 1 from the PDSCH transmitted to the terminal 90.

It may be understood that, in the embodiment, "portion" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or pan of the operations of the method in the embodiment. The storage medium includes: various media capable of storing program codes such as a U disk, a mobile hard disk, a ROM, a RAM, a magnetic disk or an optical disk.

Therefore, the embodiment provides a computer-readable medium, which stores an information transmission program, the information transmission program being executed by at least one processor to implement the following operations.

Indication information is received, where the indication information is to indicate at least one of: existence states of PDCCHs of one or more other terminals in a PDSCH transmitted to a terminal, or resource occupation states of the one or more other terminals in the PDSCH transmitted to the terminal.

The terminal performs rate matching on the PDSCH transmitted to the terminal based on the indication information.

Optionally, as another embodiment, the indication information includes one bit in PDCCH signaling or RRC signaling, and a value of the bit is configured to represent at least one of: whether the PDCCHs of the one or more other terminals exist in the PDSCH transmitted to the terminal, or whether resources in the PDSCH transmitted to the terminal are occupied by the one or more other terminals.

In the optional embodiment, when the bit value is 0, it is represented at least one of: no PDCCH of the one or more other terminals exists in the PDSCH transmitted to the terminal, or no resource in the PDSCH transmitted to the terminal is occupied by the one or more other terminals; and when the bit value is 1, it is represented at least one of: the PDCCHs of the one or more other terminals exist in the PDSCH transmitted to the terminal, or the resources in the PDSCH transmitted to the terminal are occupied by the one or more other terminals.

Optionally, as another embodiment, the information transmission program is run by the processor to further execute the following operations.

When the value of the bit is 1, resources occupied by the PDCCHs of the one or more other terminals are removed from the PDSCH transmitted to the terminal and then rate matching is performed.

When the value of the bit is 0 or after the terminal removes the resources occupied by the PDCCHs of the one or more other terminals from the PDSCH transmitted to the terminal, whether the PDSCH transmitted to the terminal includes a PDCCH configured to schedule the PDSCH is determined according to preset correspondences between time-frequency resources of a PDSCH and time-frequency resources of a PDCCH configured to schedule the PDSCH.

If the PDSCH transmitted to the terminal includes the PDCCH configured to schedule the PDSCH, the PDCCH configured to schedule the PDSCH is removed from the PDSCH transmitted to the terminal and then rate matching is performed.

If the PDSCH transmitted to the terminal does not include the PDCCH configured to schedule the PDSCH, rate matching is directly performed on the PDSCH transmitted to the terminal.

Optionally, as another embodiment, the information transmission program is run by the processor to further execute the following operation.

A CORESET corresponding to the PDCCH configured to schedule the PDSCH is removed from the PDSCH transmitted to the terminal or an RE occupied by the PDCCH configured to schedule the PDSCH is removed from the PDSCH transmitted to the terminal according to a preset removal strategy.

Optionally, as another embodiment, the information transmission program is run by the processor to further execute the following operation.

Resources occupied by CORESETs of the one or more other terminals are removed from the PDSCH transmitted to the terminal.

Optionally, as another embodiment, the indication information includes N bits in the PDCCH signaling or the RRC signaling, where N is greater than 1. Each bit corresponds to a respective one of the one or more other terminals, and each bit is configured to represent at least one of: whether a PDCCH of the corresponding other terminal exists in the PDSCH transmitted to the terminal, or whether a resource in the PDSCH transmitted to the terminal is occupied by the corresponding other terminal.

In the optional embodiment, when the value of a bit is 0, it is represented at least one of: no PDCCH of the other terminal corresponding to the bit exists in the PDSCH transmitted to the terminal, or no resource in the PDSCH transmitted to the terminal is occupied by the other terminal corresponding to the bit; and when the value of the bit is 1, it is represented at least one of: the PDCCH of the other terminal corresponding to the bit exists in the PDSCH transmitted to the terminal, or a resource in the PDSCH transmitted to the terminal is occupied by the other terminal corresponding to the bit.

Optionally, as another embodiment, the information transmission program is run by the processor to further execute the following operations.

Values of all the bits are traversed.

When the value of at least one bit in all the bits is 1, a resource occupied by the PDCCH of the other terminal corresponding to the bit of which the value is 1 is removed from the PDSCH transmitted to the terminal and then rate matching is performed.

When the values of all the bits are 0 or after the resource occupied by the PDCCH of the other terminal corresponding to the bit of which the value is 1 is removed from the PDSCH transmitted to the terminal, whether the PDSCH transmitted to the terminal includes a PDCCH configured to schedule the PDSCH is determined according to preset correspondences between time-frequency resources of a PDSCH and time-frequency resources of a PDCCH configured to schedule the PDSCH.

If the PDSCH transmitted to the terminal includes the PDCCH configured to schedule the PDSCH, the PDCCH configured to schedule the PDSCH is removed from the PDSCH transmitted to the terminal and then rate matching is performed.

If the PDSCH transmitted to the terminal does not include the PDCCH configured to schedule the PDSCH, rate matching is directly performed on the PDSCH transmitted to the terminal.

Optionally, as another embodiment, the information transmission program is run by the processor to further execute the following operation.

A resource occupied by a CORESET of the other terminal corresponding to the bit of which the value is 1 is removed from the PDSCH transmitted to the terminal.

Figure 10:
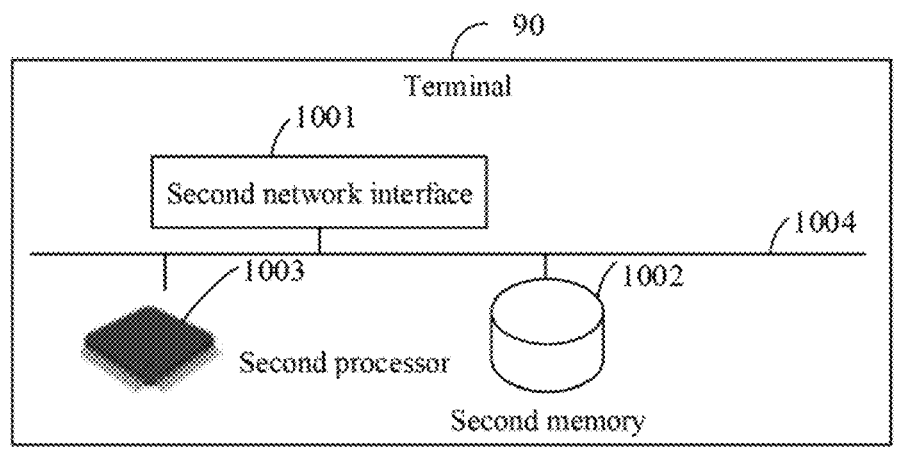
FIG. 10 is a hardware structure diagram of a terminal according to an embodiment of the disclosure.

Based on the terminal 90 and the computer-readable medium, referring to FIG. 10, a specific hardware structure of the terminal 90 provided in the embodiment of the disclosure is illustrated. The terminal 90 may include a second network interface 1001, a second memory 1002 and a second processor 1003. All components are coupled together through a bus system 1004. It may be understood that the bus system 1004 is configured to implement connection communication between these components. The bus system 1004 includes a data bus and further includes a power bus, a control bus and a state signal bus. However, for clear description, various buses in FIG. 10 are marked as the bus system 1004.

Herein, the second network interface 1001 is configured to receive and send a signal in a process of receiving and sending information with another external network element.

The second memory 1002 is configured to store a computer program capable of running in the second processor 1003.

The second processor 1003 is configured to run the computer program to:

receive indication information, where the indication information is to indicate at least one of: existence states of PDCCHs of one or more other terminals in a PDSCH transmitted to a terminal, or resource occupation states of the one or more other terminals in the PDSCH transmitted to the terminal; and perform, by the terminal, rate matching on the PDSCH transmitted to the terminal based on the indication information.

It may be understood that the second memory 1002 in the embodiment of the invention may be a volatile memory or a nonvolatile memory, or may include both the volatile and nonvolatile memories. The nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as an SRAM, a DRAM, an SDRAM, a DDRSDRAM, an ESDRAM, an SLDRAM and a DRRAM. It is to be noted that the second memory 1002 of a system and method described in the invention is intended to include, but not limited to, memories of these and any other proper types.

The second processor 1003 may be an integrated circuit chip with a signal processing capability. In an implementation process, each step of the method may be completed by an integrated logic circuit of hardware in the second processor 1003 or an instruction in a software form. The second processor 1003 may be a universal processor, a DSP, an ASIC, an FPGA or another PLD, discrete gate or transistor logical device and discrete hardware component. Each method, operation and logical block diagram disclosed in the embodiment of the disclosure may be implemented or executed. The universal processor may be a microprocessor or the processor may also be any conventional processor and the like. The operations of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the second memory 1002. The second processor 1003 reads information from the second memory 1002 and completes the operations of the method in combination with hardware.

It may be understood that these embodiments described in the disclosure may be implemented by hardware, software, firmware, middleware, a microcode or a combination thereof. In case of implementation with the hardware, the processing unit may be implemented in one or more ASICs, DSPs, DSPDs, PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the indication information includes one bit in PDCCH signaling or RRC signaling, and a value of the bit is to represent at least one of: whether the PDCCHs of the one or more other terminals exist in the PDSCH transmitted to the terminal, or whether resources in the PDSCH transmitted to the terminal is occupied by the one or more other terminals.

In the optional embodiment, when the bit value is 0, it is represented at least one of: no PDCCH of the one or more other terminals exists in the PDSCH transmitted to the terminal, or no resource is occupied by the one or more other terminals; and when the bit value is 1, it is represented at least one of: the PDCCHs of the one or more other terminals exist in the PDSCH transmitted to the terminal, or the resources in the PDSCH transmitted to the terminal are occupied by the one or more other terminals.

Optionally, as another embodiment, the second processor 1003 is further configured to run the computer program to:
when the value of the bit is 1, remove the resources occupied by the PDCCHs of the one or more other terminals from the PDSCH transmitted to the terminal and then perform rate matching; and
when the value of the bit is 0 or after the resources occupied by the PDCCHs of the one or more other terminals are removed from the PDSCH transmitted to the terminal, determine whether the PDSCH transmitted to the terminal 90 includes a PDCCH configured to schedule the PDSCH according to preset correspondences between time-frequency resources of a PDSCH and time-frequency resources of a PDCCH configured to schedule the PDSCH,
if the PDSCH transmitted to the terminal includes the PDCCH configured to schedule the PDSCH, remove the PDCCH configured to schedule the PDSCH from the PDSCH transmitted to the terminal and then perform rate matching, and
if the PDSCH transmitted to the terminal does not include the PDCCH configured to schedule the PDSCH, directly perform rate matching on the PDSCH transmitted to the terminal.

Optionally, as another embodiment, the second processor 1003 is further configured to run the computer program to:
remove a CORESET corresponding to the PDCCH configured to schedule the PDSCH from the PDSCH transmitted to the terminal or remove an RE occupied by the PDCCH configured to schedule the PDSCH from the PDSCH transmitted to the terminal according to a preset removal strategy.

Optionally, as another embodiment, the second processor 1003 is further configured to run the computer program to:
remove resources occupied by CORESETs of the one or more other terminals from the PDSCH transmitted to the terminal.

Optionally, as another embodiment, the indication information includes N bits in the PDCCH signaling or the RRC signaling, where N is greater than 1. Each bit corresponds to a respective one of the one or more terminals, and each bit is configured to represent at least one of: whether a PDCCH of the corresponding other terminal exists in the PDSCH transmitted to the terminal, or whether a resource is occupied by the corresponding other terminal.

In the optional embodiment, when the value of a bit is 0, it is represented at least one of: no PDCCH of the other terminal corresponding to the bit exists in the PDSCH transmitted to the terminal, or no resource in the PDSCH transmitted to the terminal is occupied by the other terminal corresponding to the bit; and when the value of the bit is 1, it is represented at least one of: the PDCCH of the other terminal corresponding to the bit exists in the PDSCH transmitted to the terminal, or a resource in the PDSCH transmitted to the terminal is occupied by the other terminal corresponding to the bit.

Optionally, as another embodiment, the second processor 1003 is further configured to run the computer program to:
traverse values of all the bits;
when a value of at least one bit in all the bits is 1, remove a resource occupied by the PDCCH of the other terminal corresponding to the bit of which the value is 1 from the PDSCH transmitted to the terminal and then perform rate matching; and
when the values of all the bits are 0 or after the resource occupied by the PDCCH of the other terminal corresponding to the bit of which the value is 1 is removed from the PDSCH transmitted to the terminal, determine whether the PDSCH transmitted to the terminal includes a PDCCH configured to schedule the PDSCH according to preset correspondences between time-frequency resources of a PDSCH and time-frequency resources of a PDCCH configured to schedule the PDSCH,
if the PDSCH transmitted to the terminal includes the PDCCH configured to schedule the PDSCH, remove the PDCCH configured to schedule the PDSCH from the PDSCH transmitted to the terminal and then perform rate matching, and
if the PDSCH transmitted to the terminal does not include the PDCCH configured to schedule the PDSCH, directly perform rate matching on the PDSCH transmitted to the terminal.

Optionally, as another embodiment, the second processor 1003 is further configured to run the computer program to:
remove a resource occupied by a CORESET of the other terminal corresponding to the bit of which the value is 1 from the PDSCH transmitted to the terminal.

Sixth Embodiment

Figure 11:
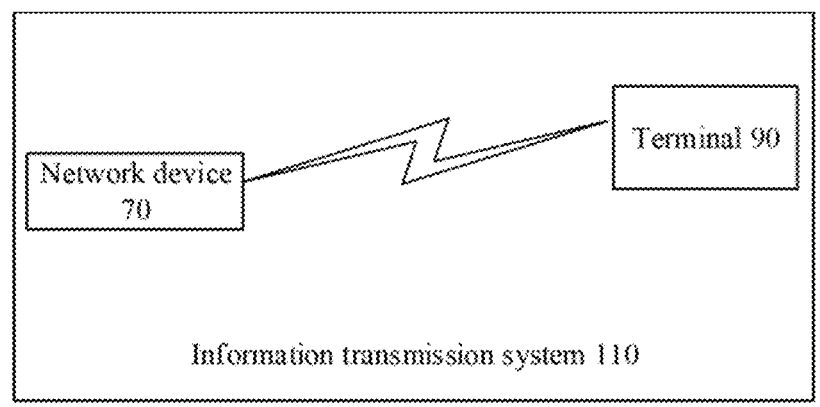
FIG. 11 is a composition diagram of a system for information transmission according to an embodiment of the disclosure.

Based on the same inventive concept of the abovementioned embodiment, referring to FIG. 11, a schematic structure of an information transmission system 110 provided in the embodiment of the disclosure is illustrated, which may include a network device 70 and a terminal 90.

The network device 70 is configured to generate indication information for the terminal 90, where the indication information is to indicate at least one of: existence states of PDCCHs of one or more other terminals in a PDSCH transmitted to the terminal 90, or resource occupation states of the one or more other terminals in the PDSCH transmitted to the terminal, and transmit the indication information to the terminal 90.

The terminal 90 is configured to receive the indication information and perform rate matching on the PDSCH transmitted to the terminal based on the indication information.

In a specific implementation process, the network device 70 in the embodiment may preferably be the network device 70 in any abovementioned embodiment, and the terminal 90 may preferably be the terminal 90 in any abovementioned embodiment.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure.

INDUSTRIAL APPLICABILITY

In the embodiments, the network device may carry the indication information through the PDCCH signaling or the RRC signaling to enable the terminal to learn at least one of: whether PDCCHs of one or more other terminals exist in a PDSCH transmitted to the terminal, or whether resources in the PDSCH transmitted to the terminal are occupied by the one or more other terminals. Therefore, PDSCH rate matching may be performed based on a content learned from the indication information to avoid the condition that a PDSCH data packet may not be correctly parsed in a short time period due to a matching error.

The invention claimed is:

1. A method for information transmission, comprising:
receiving, by a terminal, indication information, wherein the indication information is to indicate at least one of: existence states of physical downlink control channels (PDCCHs) of one or more other terminals in a physical downlink shared channel (PDSCH) transmitted to the terminal, or resource occupation states of the one or more other terminals in the PDSCH transmitted to the terminal; and
performing, by the terminal, rate matching on the PDSCH transmitted to the terminal based on the indication information,
wherein the indication information comprises N bits in PDCCH signaling or radio resource control (RRC) signaling, wherein N is greater than 1, each bit corresponds to a respective one of the one or more other terminals, and each bit is to represent at least one of: whether a PDCCH of the other terminal corresponding to the bit exists in the PDSCH transmitted to the terminal, or whether a resource in the PDSCH transmitted to the terminal is occupied by the other terminal corresponding to the bit; and
wherein, when a value of the bit is 0, the value of the bit represents at least one of: no PDCCH of the other terminal corresponding to the bit exists in the PDSCH transmitted to the terminal, or no resource in the PDSCH transmitted to the terminal is occupied by the other terminal corresponding to the bit; and when the value of the bit is 1, the value of the bit represents at least one of: the PDCCH of the other terminal corresponding to the bit exists in the PDSCH transmitted to the terminal, or the resource in the PDSCH transmitted to the terminal is occupied by the other terminal corresponding to the bit.

2. The method of claim 1, wherein performing the rate matching on the PDSCH transmitted to the terminal comprises:
traversing, by the terminal, values of all the bits;
when a value of at least one of all the bits is 1, removing, by the terminal, a resource occupied by a PDCCH of the other terminal corresponding to the bit of which the value is 1 from the PDSCH transmitted to the terminal and then performing the rate matching; and
when the values of all the bits are 0 or after the terminal removes the resource occupied by the PDCCH of the other terminal corresponding to the bit of which the value is 1 from the PDSCH transmitted to the terminal, determining, by the terminal, whether the PDSCH transmitted to the terminal comprises a PDCCH configured to schedule the PDSCH according to preset correspondences between time-frequency resources of a PDSCH and time-frequency resources of a PDCCH configured to schedule the PDSCH,
when the PDSCH transmitted to the terminal comprises the PDCCH configured to schedule the PDSCH, removing, by the terminal, the PDCCH configured to schedule the PDSCH from the PDSCH transmitted to the terminal and then performing the rate matching, and
when no PDCCH configured to schedule the PDSCH exists in the PDSCH transmitted to the terminal, performing, by the terminal, the rate matching on the PDSCH transmitted to the terminal.

3. The method of claim 2, wherein removing, by the terminal, the resource occupied by the PDCCH of the other terminal corresponding to the bit of which the value is 1 from the PDSCH transmitted to the terminal comprises:

removing, by the terminal, a resource occupied by a control resource set (CORESET) of the other terminal corresponding to the bit of which the value is 1 from the PDSCH transmitted to the terminal.

4. The method of claim 1, wherein the PDCCH signaling comprises downlink control information (DCI).

5. A terminal, comprising a second network interface, a second memory and a second processor, wherein
the second network interface is configured to receive and send a signal in a process of receiving and transmitting information with another external network element;
the second memory is configured to store a computer program capable of running in the second processor; and
the second processor is configured to run the computer program to:
receive indication information via the second network interface, wherein the indication information is to indicate at least one of: existence states of a physical downlink control channels (PDCCHs) of one or more other terminals in a physical downlink shared channel (PDSCH) transmitted to the terminal, or resource occupation states of the one or more other terminals in the PDSCH transmitted to the terminal; and
perform rate matching on the PDSCH transmitted to the terminal based on the indication information,
wherein the indication information comprises N bits in PDCCH signaling or radio resource control (RRC) signaling, wherein N is greater than 1, each bit corresponds to a respective one of the one or more other terminals, and each bit is to represent at least one of: whether a PDCCH of the other terminal corresponding to the bit exists in the PDSCH transmitted to the terminal, or whether a resource in the PDSCH transmitted to the terminal is occupied by the other terminal corresponding to the bit; and
wherein, when a value of the bit is 0, the value of the bit represents at least one of: no PDCCH of the other terminal corresponding to the bit exists in the PDSCH transmitted to the terminal, or no resource is occupied by the other terminal corresponding to the bit; and when the value of the bit is 1, the value of the bit represents at least one of: the PDCCH of the other terminal corresponding to the bit exists in the PDSCH transmitted to the terminal, or the resource in the PDSCH transmitted to the terminal is occupied by the other terminal corresponding to the bit.

6. The terminal of claim 5, wherein the second processor is configured to:
traverse values of all the bits;
when a value of at least one of all the bits is 1, remove a resource occupied by a PDCCH of the other terminal corresponding to the bit of which the value is 1 from the PDSCH transmitted to the terminal and then perform the rate matching; and
when the values of all the bits are 0 or after the resource occupied by the PDCCH of the other terminal corresponding to the bit of which the value is 1 is removed from the PDSCH transmitted to the terminal, determine whether the PDSCH transmitted to the terminal comprises a PDCCH configured to schedule the PDSCH according to preset correspondences between time-frequency resources of a PDSCH and time-frequency resources of a PDCCH configured to schedule the PDSCH,
when the PDSCH transmitted to the terminal comprises the PDCCH configured to schedule the PDSCH, remove the PDCCH configured to schedule the PDSCH from the PDSCH transmitted to the terminal and then perform the rate matching, and
when no PDCCH configured to schedule the PDSCH exists in the PDSCH transmitted to the terminal, perform the rate matching on the PDSCH transmitted to the terminal.

7. The terminal of claim 6, wherein the second processor is configured to:
remove a resource occupied by a control resource set (CORESET) of the other terminal corresponding to the bit of which the value is 1 from the PDSCH transmitted to the terminal.

8. The terminal of claim 5, wherein the PDCCH signaling comprises downlink control information (DCI).

9. A network device, comprising a first network interface, a first memory and a first processor, wherein
the first network interface is configured to receive and send a signal in a process of receiving and transmitting information with another external network element;
the first memory is configured to store a computer program capable of running in the first processor; and
the first processor is configured to run the computer program to:
generate indication information for a target terminal, wherein the indication information is to indicate at least one of: existence states of physical downlink control channels (PDCCHs) of one or more non-target terminals in a physical downlink shared channel (PDSCH) transmitted to the target terminal, or resource occupation states of the one or more non-target terminals in the PDSCH transmitted to the target terminal; and
transmit, via the first network interface, the indication information to the target terminal,
wherein the indication information comprises N bits in PDCCH signaling or radio resource control (RRC) signaling, wherein N is greater than 1, each bit corresponds to a respective one of the one or more non-target terminals, and each bit is used for representing at least one of: whether a PDCCH of the non-target terminal corresponding to the bit exists in the PDSCH transmitted to the target terminal, or whether a resource in the PDSCH transmitted to the target terminal is occupied by the non-target terminal corresponding to the bit; and
wherein, when a value of the bit is 0, it is represented at least one of: no PDCCH of the non-target terminal corresponding to the bit exists in the PDSCH transmitted to the target terminal, or no resource in the PDSCH transmitted to the target terminal is occupied by the non-target terminal corresponding to the bit; and when the value of the bit is 0, it is represented at least one of: the PDCCH of the non-target terminal corresponding to the bit exists in the PDSCH transmitted to the target terminal, or the resource in the PDSCH transmitted to the target terminal is occupied by the non-target terminal corresponding to the bit.

10. The network device of claim 9, wherein the PDCCH signaling comprises downlink control information (DCI).

11. A method for information transmission, comprising:
generating indication information for a target terminal, wherein the indication information is to indicate at least one of: existence states of physical downlink control channels (PDCCHs) of one or more non-target terminals in a physical downlink shared channel (PDSCH) transmitted to the target terminal, or resource occupation states of the one or more non-target terminals in the PDSCH transmitted to the target terminal; and transmitting the indication information to the target terminal, wherein the indication information comprises N bits in PDCCH signaling or radio resource control (RRC) signaling, wherein N is greater than 1, each bit corresponds to a respective one of the one or more non-target terminals, and each bit is used for representing at least one of: whether a PDCCH of the non-target terminal corresponding to the bit exists in the PDSCH transmitted to the target terminal, or whether a resource in the PDSCH transmitted to the target terminal is occupied by the non-target terminal corresponding to the bit; and wherein, when a value of the bit is 0, it is represented at least one of: no PDCCH of the non-target terminal corresponding to the bit exists in the PDSCH transmitted to the target terminal, or no resource in the PDSCH transmitted to the target terminal is occupied by the non-target terminal corresponding to the bit; and when the value of the bit is 1, it is represented at least one of: the PDCCH of the non-target terminal corresponding to the bit exists in the PDSCH transmitted to the target terminal, or the resource in the PDSCH transmitted to the target terminal is occupied by the non-target terminal corresponding to the bit.

12. The method of claim 11, wherein the PDCCH signaling comprises downlink control information (DCI).

* * * * *